(12) United States Patent
Chapel

(10) Patent No.: US 7,043,871 B2
(45) Date of Patent: May 16, 2006

(54) FISHING LURE HOLDER

(76) Inventor: Karl Chapel, 15426 Forest Park Dr., Grand Haven, MI (US) 49417

( * ) Notice: Subject to any disclaimer, the term of this patent is extended or adjusted under 35 U.S.C. 154(b) by 0 days.

(21) Appl. No.: 10/759,967

(22) Filed: Jan. 16, 2004

(65) Prior Publication Data

US 2005/0155274 A1    Jul. 21, 2005

(51) Int. Cl.
*A01K 97/06* (2006.01)
(52) U.S. Cl. ..................................... 43/57.1
(58) Field of Classification Search ............. 43/54.1, 43/57.1, 25.2; 206/315.11
See application file for complete search history.

(56) References Cited

U.S. PATENT DOCUMENTS

| | | | |
|---|---|---|---|
| 1,365,111 A * | 1/1921 | Lawrence | 43/57.1 |
| 1,788,674 A | 1/1931 | Hughes | |
| 2,285,888 A | 6/1942 | Benton | |
| 2,537,730 A | 1/1951 | Anderson | |
| 2,548,080 A * | 4/1951 | Thorn | 224/663 |
| 2,729,913 A | 1/1956 | Holwerda | |
| 3,832,798 A | 9/1974 | Pilston | |
| 3,897,650 A | 8/1975 | Pilston | |
| 3,908,298 A | 9/1975 | Strader | |
| 4,383,385 A | 5/1983 | Myers | |
| 4,413,438 A | 11/1983 | Hayne | |
| 4,604,822 A * | 8/1986 | Christenberry | 43/57.1 |
| 4,680,886 A | 7/1987 | Caselli, Sr. | |
| 4,681,220 A | 7/1987 | Beneke | |
| 4,914,851 A | 4/1990 | Acker | |
| 4,947,577 A | 8/1990 | Abbotoy | |
| D320,060 S | 9/1991 | Austin | |
| 5,056,256 A | 10/1991 | Truax | |
| 5,095,645 A | 3/1992 | Borawski | |
| D328,544 S | 8/1992 | Salazar | |
| 5,199,208 A | 4/1993 | Matchette | |
| 5,311,698 A | 5/1994 | Plost | |
| 5,430,969 A | 7/1995 | Taylor et al. | |
| 5,446,990 A | 9/1995 | Eriksson | |
| 5,533,297 A | 7/1996 | Crosby | |
| D399,912 S | 10/1998 | Kopp, III | |
| 5,934,464 A | 8/1999 | Vargo et al. | |
| 5,960,579 A | 10/1999 | Hampton | |
| 5,996,273 A | 12/1999 | George | |
| 6,009,660 A | 1/2000 | Rice | |
| 6,367,190 B1 | 4/2002 | Looney et al. | |
| 6,530,488 B1 | 3/2003 | Krammes, Jr. | |

\* cited by examiner

*Primary Examiner*—T. Nguyen
(74) *Attorney, Agent, or Firm*—Price, Heneveld, Cooper, DeWitt & Litton, LLP

(57) ABSTRACT

A holder for fishing lures includes a body portion having a generally truncated conical shape defining a cavity and having a reduced diameter first end. The body portion has an enlarged diameter second end, a first opening at the first end, and a second opening at the second end. The first opening is substantially smaller than the second opening such that a leader that can be fed through the first opening, and a fishing lure can be inserted into the cavity through the second opening. A leader retainer is integrally formed with the body portion. The leader retainer comprises a generally flat web extending from the body portion and includes a pair of spaced apart edge portions shaped to receive and retain a leader wound around the web.

3 Claims, 2 Drawing Sheets

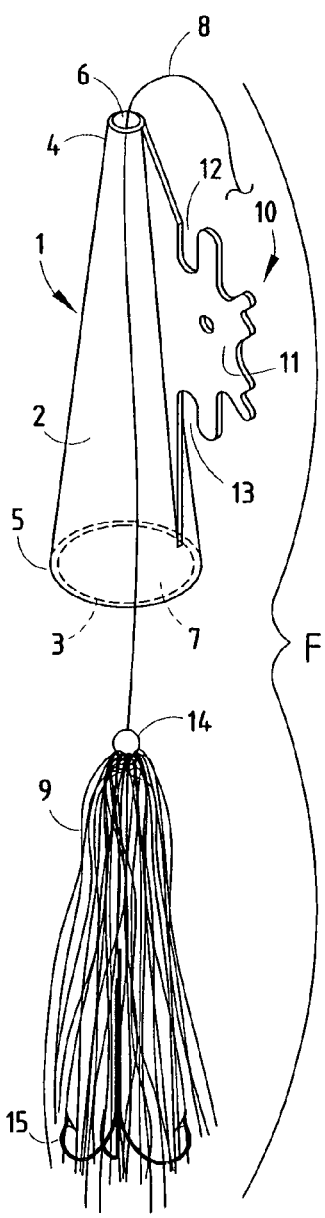
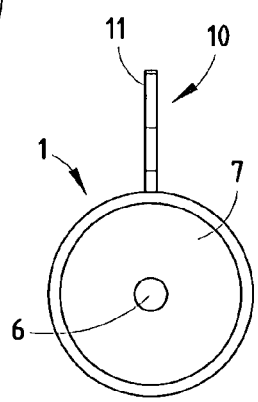
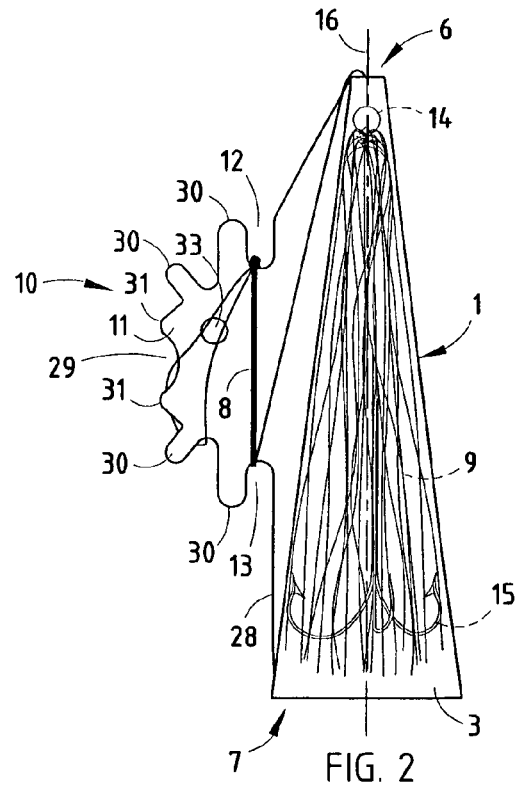
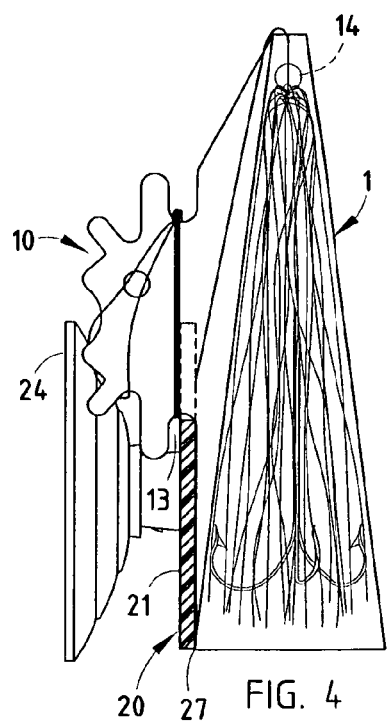
FIG. 1
FIG. 2
FIG. 3
FIG. 4

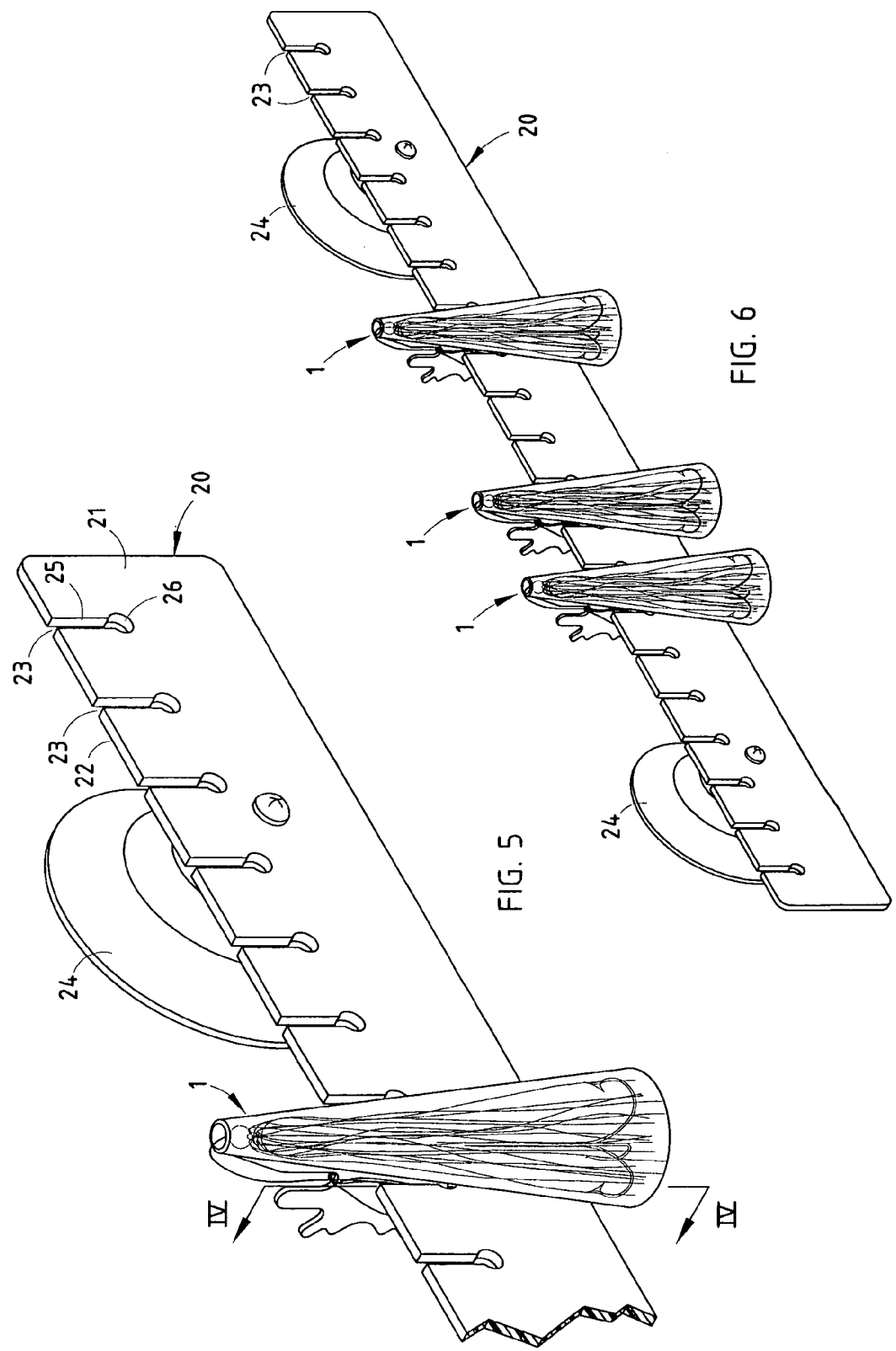

FISHING LURE HOLDER

BACKGROUND OF THE INVENTION

Various tackle boxes and the like have been developed for storing fishing lures. However, such tackle boxes may be cumbersome to use while fishing, and may not provide ready access to the lures. Also, such tackle boxes may be quite large, and take up substantial floor space when used in a boat. Furthermore, if the tackle box is left open and the boat encounters waves, the tackle box may tip over, causing the contents to spill on the boat floor. Still further, the design of known tackle boxes does not readily provide for storing fishing lures of the type having a leader. For example, streamer flies or the like commonly include a leader that remains attached to the lure when not in use. Such leaders tend to become tangled, and can be quite difficult to store in a conventional tackle box. Accordingly, a storage/holding device alleviating these drawbacks of existing arrangements would be desirable.

SUMMARY OF THE INVENTION

One aspect of the present invention is a holder for fishing lures of the type having a leader. The holder includes a body portion having a generally truncated conical shape defining a cavity and having a reduced diameter first end. The body portion has an enlarged diameter second end, a first opening at the first end, and a second opening at the second end. The first opening is substantially smaller than the second opening such that a leader that can be fed through the first opening, and a fishing lure can be inserted into the cavity through the second opening. A leader retainer is integrally formed with the body portion. The leader retainer comprises a generally flat web extending from the body portion, and defines a pair of spaced apart edge portions shaped to receive and retain a leader wound around the web.

Yet another aspect of the present invention is a kit for holding fishing lures. The kit includes an elongated rack having a generally horizontal upper edge including a plurality of notches in the upper edge. The kit also includes a plurality of fishing lure holders, each of which includes a body portion having a generally truncated conical shape defining a cavity and having a reduced diameter first end, an enlarged diameter second end, a first opening at the first end, and a second opening at the second end. The first opening is smaller than the second opening such that a leader can be fed through the first opening, and a fishing lure can be inserted into the cavity through the second opening. Each fishing lure holder also includes a retainer integrally formed with the body portion. The leader retainer comprises a generally flat web extending from the body portion and defining spaced apart edge portions shaped to receive a leader wound around the web. At least one of the edge portions is adapted to engage a selected one of the notches in the elongated rack and retain the fishing lure holder in a generally upright position at a selected horizontal location.

Another aspect of the present invention is a combination holder and fishing lure including a fishing lure having a body portion, at least one hook, and a leader. The holder has a body portion with a generally truncated conical shape defining a cavity and a reduced diameter first end, an enlarged diameter second end, a first opening at the first end, and a second opening at the second end. The first opening is substantially smaller than the second opening, such that the leader can be fed through the first opening, and the fishing lure can be inserted into the cavity through the second opening. The first opening is smaller than the body portion of the lure such that the body portion of the lure cannot fit through the first opening. A leader retainer is integrally formed with the body portion. The leader retainer comprises a generally flat web extending from the body portion and defining spaced apart edge portions. The leader is wound around the web and engages the edge portions.

These and other features, advantages, and objects of the present invention will be further understood and appreciated by those skilled in the art by reference to the following specification, claims, and appended drawings.

BRIEF DESCRIPTION OF THE DRAWINGS

FIG. 1 is a perspective view of a fishing lure holder and an associated fishing lure according to one aspect of the present invention;

FIG. 2 is a side view of the fishing lure holder of FIG. 1;

FIG. 3 is an end view of the fishing lure holder of FIG. 1;

FIG. 4 is a side view of the fishing lure holder positioned on a rack;

FIG. 5 is a partially fragmentary, perspective view of a fishing lure holder on a rack; and FIG. 6 is a perspective view of a plurality of fishing lure holders mounted on a rack.

DETAILED DESCRIPTION OF PREFERRED EMBODIMENT

For purposes of description herein, the terms "upper," "lower," "right," "left," "rear," "front," "vertical," "horizontal," and derivatives thereof shall relate to the invention as oriented in FIG. 6. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a fishing lure holder 1 according to one aspect of the present invention includes a body portion 2 having a generally truncated conical shape defining a cavity 3. The body portion has a reduced diameter first end 4, an enlarged diameter second end 5, a first opening 6 at the first end 4, and a second opening 7 at the second end 5 (see also FIG. 3). The first opening 6 is substantially smaller in diameter than the second opening 7, such that a leader 8 that is attached to a lure 9 such as a streamer fly or the like can be fed through the first opening 6, and a fishing lure 9 can be inserted into the cavity 3 through the second opening 7. When inserted, the lure 9 is completely received within the cavity 3 as illustrated in FIG. 2. A leader retainer 10 is integrally formed with the body portion 2. The leader retainer 10 comprises a generally flat web 11 extending from the body portion 2 and defines spaced apart edge portions 12 and 13 shaped to receive and retain a leader 8 wound around the web 11. The body portion 2 of the fishing lure holder 1 is preferably made of a clear polymer material, such that a user can readily determine which lure is located within a given fishing lure holder 1.

The first opening 6 is preferably substantially smaller than a body portion of a lure such as a bead 14, such that the lure 9 cannot slide through the opening 6 when inserted into the cavity 3. As illustrated in FIG. 2, the body portion 2 of the fishing lure holder 1 is preferably at least about the same length as the fishing lure 9, such that the fishing lure 9 can be completely inserted into the cavity 3 with hooks 15 of lure 9 received in the cavity 3. In this way, the fishing lure holder 1 ensures that the hooks 15 are safely covered, and do not inadvertently become snagged. Also, the edge portions 12 and 13 of web 11 that receive leader 8 are preferably of a concave shape, such that the portion of the leader 8 that is wound around the web 11 is generally aligned with the axis 16 of the conical body portion 2.

With further reference to FIGS. 4–6, one or more of the fishing lure holders 1 can be mounted on a rack 20. The rack 20 comprises a plate-like elongated body portion 21 having an upper edge 22 with a plurality of notches 23 in the upper edge 22. Each of the notches 23 includes a slot portion 25 and an end portion 26 that is radiused such that the notch 23 has a shape that is generally that of an upside-down keyhole. Suction cups 24 provide for securing the rack 20 to a surface such as the inside of a boat or the like during use. Other mounting arrangements such as brackets or the like (not shown) may also be utilized if a more permanent attachment is required for a particular application.

As illustrated in FIG. 4, the fishing lure holder 1 is positioned on the rack 20 with edge portion 13 positioned within a selected notch 23. A flange portion 28 (see also FIG. 2) of web 11 and/or an outer surface portion 27 of the fishing lure holder 1 abut the body portion 21 of rack 20, thereby holding the fishing lure 1 in a generally upright position on the rack 20.

During use, a lure 9 may be installed into a fishing lure holder 1 by first feeding the leader 8 into the cavity 3 and through the first opening 6. The lure 9 is then positioned within the cavity 3 by pulling on the leader and/or grasping the lure 9. The leader 8 is then wound around edge portions 12 and 13 of the leader retainer 10, and a loop 29 at the end of leader 8 can be placed over prongs 30 and/or raised portions 31 of web 11 and/or feed through an aperture 33 of web 11 to keep the leader 8 from unwinding. The fishing lure holder 1 can then be placed on the rack 20 by positioning the edge portion 12 or 13 of web 111 in a selected one of the notches 23.

When fishing, it is often desirable to change lures while trolling or the like to determine if the fish have a preference for a particular lure or color on a given day. The fishing lure holder and rack of the present invention provide a very convenient and safe way for a user to store and retrieve fishing lures as required, particularly on a boat. The fishing lure holder 1 of the present invention ensures that the leaders of the lures do not become tangled, yet provides ready access to the lures for the user. Also, because the hooks of the lure are completely enclosed within the cavity of the fishing lure holder, injuries or the like that could otherwise result if the hooks were stored in an open manner are prevented.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A combination holder and fishing lure, comprising:
   a fishing lure having a body portion, at least one hook, and a leader including a loop at an end of the leader;
   a holder having a body portion defining a cavity, an axis, a reduced diameter first end, an enlarged diameter second end, a first opening at the first end, and a second opening at the second end, wherein the first opening is substantially smaller than the second opening, wherein the body portion of the lure is disposed in the cavity and the leader extends through the first opening, and wherein the first opening is smaller than the body portion of the lure such that the body portion of the lure cannot fit through the first opening;
   a leader retainer structure extending from the body portion and defining spaced apart edge portions that are each equally spaced from the axis, the leader retainer structure comprising a flat web defining a plane intersecting the axis, wherein the leader is wound around the leader retainer structure and engages the edge portions, and wherein:
   the leader retainer structure includes at least one prong extending from the web, and the loop at the end of the leader extends around the prong to retain the leader.

2. The combination holder and fishing lure of claim 1, wherein:
   the body portion has a substantially uniform wall thickness.

3. The combination holder and fishing lure of claim 1, wherein:
   the body portion of the holder defines an axis, and the leader retainer comprises a web defining a central plane coincident with the axis.

* * * * *

UNITED STATES PATENT AND TRADEMARK OFFICE
CERTIFICATE OF CORRECTION

PATENT NO. : 7,043,871 B2 Page 1 of 1
APPLICATION NO. : 10/759967
DATED : May 16, 2006
INVENTOR(S) : Karl Chapel It is certified that error appears in the above-identified patent and that said Letters Patent is hereby corrected as shown below:

Column 3, line 41;

"web 111" should be --web 11--.

Signed and Sealed this

Thirtieth Day of January, 2007

JON W. DUDAS
*Director of the United States Patent and Trademark Office*